(12) United States Patent
Schweitzer, III et al.

(10) Patent No.: US 10,375,108 B2
(45) Date of Patent: Aug. 6, 2019

(54) TIME SIGNAL MANIPULATION AND SPOOFING DETECTION BASED ON A LATENCY OF A COMMUNICATION SYSTEM

(71) Applicant: Schweitzer Engineering Laboratories, Inc., Pullman, WA (US)

(72) Inventors: Edmund O. Schweitzer, III, Pullman, WA (US); Cody W. Tews, Pullman, WA (US); David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 180 days.

(21) Appl. No.: 15/394,097

(22) Filed: Dec. 29, 2016

(65) Prior Publication Data

US 2017/0195362 A1 Jul. 6, 2017

Related U.S. Application Data

(60) Provisional application No. 62/272,889, filed on Dec. 30, 2015.

(51) Int. Cl.
*H04L 29/06* (2006.01)
*G06F 11/07* (2006.01)
*H04L 12/26* (2006.01)

(52) U.S. Cl.
CPC ...... *H04L 63/1466* (2013.01); *G06F 11/0709* (2013.01); *G06F 11/0793* (2013.01);
(Continued)

(58) Field of Classification Search
CPC .................................................. H04L 63/1466
See application file for complete search history.

(56) References Cited

U.S. PATENT DOCUMENTS

| 5,160,926 A | 11/1992 | Schweitzer, III |
| 5,557,284 A | 9/1996 | Hartman |

(Continued)

FOREIGN PATENT DOCUMENTS

| WO | 9747987 | 12/1997 |
| WO | 2012151006 | 11/2012 |
| WO | 2014005016 | 1/2014 |

OTHER PUBLICATIONS

PCT/US2016/069374 Patent Cooperation Treaty, International Search Report and Written Opinion of the International Searching Authority, dated Mar. 30, 2017.

(Continued)

*Primary Examiner* — Simon P Kanaan
(74) *Attorney, Agent, or Firm* — Jared L. Cherry; Bradley W. Schield (57) ABSTRACT

This disclosure relates to detecting manipulation or spoofing of a time based on a latency of a communication system. In one embodiment, a system includes a time input to receive a time signal. The system includes a first interface to receive a first representation of a first condition at a first location at a first time and a second interface to receive a second representation of a second condition at a second location and at the first time. A latency determination subsystem may determine a latency based on a comparison of the time of arrival of the second measurement and the first time. A threshold subsystem may generate an indication of whether the latency satisfies a threshold. An anomalous condition subsystem may identify an anomalous condition based on the indication, and a remedial action may be implemented based on the anomalous condition.

19 Claims, 6 Drawing Sheets

(52) U.S. Cl.
CPC .......... *H04L 43/0852* (2013.01); *H04L 43/16* (2013.01); *H04L 63/1441* (2013.01); *H04L 2463/121* (2013.01); *Y04S 40/168* (2013.01)

(56) References Cited

U.S. PATENT DOCUMENTS

| | | | |
|---|---|---|---|
| 5,737,715 | A | 4/1998 | Deaton |
| 6,144,334 | A | 11/2000 | Claffey |
| 6,229,479 | B1 | 5/2001 | Kozlov |
| 6,483,856 | B1 | 11/2002 | Bird |
| 7,146,516 | B2 | 12/2006 | Dhupar |
| 7,375,683 | B2 | 5/2008 | Smith |
| 7,398,411 | B2 | 7/2008 | Zweigle |
| 7,436,232 | B2 | 10/2008 | Sivero |
| 7,440,427 | B1 | 10/2008 | Katz |
| 7,606,541 | B1 | 10/2009 | Nicholls |
| 7,940,213 | B2 | 5/2011 | Harper |
| 7,952,519 | B1 | 5/2011 | Nielsen |
| 7,978,130 | B1 | 7/2011 | Cohen |
| 7,979,228 | B2 | 7/2011 | Zurbuchen |
| 8,055,288 | B2 | 11/2011 | Ladd |
| 8,138,972 | B2 | 3/2012 | Underbrink |
| 8,159,391 | B2 | 4/2012 | Papadimitratos |
| 8,237,609 | B2 | 8/2012 | Talbot |
| 8,325,087 | B2 | 12/2012 | Thomson |
| 8,326,319 | B2 | 12/2012 | Davis |
| 8,446,896 | B2 | 5/2013 | Bedrosian |
| 8,564,330 | B1 | 10/2013 | Radulov |
| 8,655,608 | B2 | 2/2014 | Guzman-Casillas |
| 8,867,520 | B2 | 10/2014 | Nicholls |
| 9,083,503 | B2 | 7/2015 | Sagen |
| 9,270,442 | B2 | 2/2016 | Rice |
| 9,300,591 | B2 | 3/2016 | Rajasekaran |
| 9,319,100 | B2 | 4/2016 | Achanta |
| 9,400,330 | B2 | 7/2016 | Achanta |
| 9,520,860 | B2 | 12/2016 | Whitehead |
| 9,599,719 | B2 | 3/2017 | Achanta |
| 9,709,682 | B2 | 7/2017 | Achanta |
| 9,759,816 | B2 | 9/2017 | Achanta |
| 2002/0033767 | A1 | 3/2002 | Krasner |
| 2002/0136172 | A1 | 9/2002 | Chun |
| 2002/0158693 | A1 | 10/2002 | Soong |
| 2002/0167934 | A1 | 11/2002 | Carter |
| 2003/0004689 | A1 | 1/2003 | Gupta |
| 2003/0087654 | A1 | 5/2003 | Wheeler |
| 2003/0107513 | A1 | 6/2003 | Abraham |
| 2004/0062279 | A1 | 4/2004 | Primrose |
| 2004/0166879 | A1 | 8/2004 | Meadows |
| 2004/0228368 | A1 | 11/2004 | Jecmen |
| 2005/0114023 | A1 | 5/2005 | Williamson |
| 2006/0259806 | A1 | 11/2006 | Zweigle |
| 2007/0132773 | A1 | 6/2007 | Plante |
| 2007/0194987 | A1 | 8/2007 | Fedora |
| 2008/0062039 | A1 | 3/2008 | Cohen |
| 2008/0071482 | A1 | 3/2008 | Zweigle |
| 2008/0169978 | A1 | 7/2008 | Powell |
| 2008/0186229 | A1 | 8/2008 | Van Diggelen |
| 2008/0198069 | A1 | 8/2008 | Gronemeyer |
| 2009/0117928 | A1 | 5/2009 | Ladd |
| 2009/0160705 | A1 | 6/2009 | Matsuzaki |
| 2009/0262016 | A1 | 10/2009 | Wirola |
| 2009/0315764 | A1 | 12/2009 | Cohen |
| 2010/0030916 | A1 | 2/2010 | Greenwood |
| 2010/0034190 | A1 | 2/2010 | Yun |
| 2010/0073228 | A1 | 3/2010 | Smith |
| 2010/0117899 | A1 | 5/2010 | Papadimitratos |
| 2010/0127928 | A1 | 5/2010 | Thomson |
| 2010/0190509 | A1 | 7/2010 | Davis |
| 2010/0222068 | A1 | 9/2010 | Gaal |
| 2010/0231445 | A1 | 9/2010 | Tarlow |
| 2010/0231448 | A1 | 9/2010 | Harper |
| 2010/0253578 | A1 | 10/2010 | Mantovani |
| 2010/0254225 | A1 | 10/2010 | Schweitzer, III |
| 2011/0001668 | A1 | 1/2011 | Cobb |
| 2011/0035066 | A1* | 2/2011 | Schweitzer, III ... H02J 13/0062 13/62 |
| 2011/0063767 | A1* | 3/2011 | Kasztenny ............... H02H 3/28 361/66 |
| 2011/0068973 | A1 | 3/2011 | Humphreys |
| 2011/0085540 | A1 | 4/2011 | Kuwabara |
| 2011/0102258 | A1 | 5/2011 | Underbrink |
| 2011/0102259 | A1* | 5/2011 | Ledvina ............... G01S 19/215 342/357.59 |
| 2011/0169577 | A1 | 7/2011 | Nicholls |
| 2011/0181466 | A1 | 7/2011 | Serrano |
| 2011/0227787 | A1 | 9/2011 | Gum |
| 2011/0261917 | A1 | 10/2011 | Bedrosian |
| 2011/0285586 | A1 | 11/2011 | Ferguson |
| 2011/0287779 | A1 | 11/2011 | Harper |
| 2012/0005326 | A1 | 1/2012 | Bradetich |
| 2012/0026037 | A1 | 2/2012 | Thomson |
| 2012/0030495 | A1 | 2/2012 | Chandhoke |
| 2012/0066418 | A1 | 3/2012 | Foster |
| 2012/0116677 | A1 | 5/2012 | Higgison |
| 2012/0179404 | A1 | 7/2012 | Lee |
| 2012/0182181 | A1 | 7/2012 | Dai |
| 2012/0195253 | A1 | 8/2012 | Irvine |
| 2012/0195350 | A1 | 8/2012 | Das |
| 2012/0323397 | A1 | 12/2012 | Schweitzer, III |
| 2013/0157593 | A1 | 6/2013 | Achanta |
| 2013/0244624 | A1 | 9/2013 | Das |
| 2013/0328606 | A1 | 12/2013 | Ravi |
| 2013/0335266 | A1 | 12/2013 | Vollath |
| 2014/0003199 | A1 | 1/2014 | Dougan |
| 2014/0094218 | A1 | 4/2014 | Hammes |
| 2014/0100702 | A1 | 4/2014 | Schweitzer |
| 2014/0114608 | A1 | 4/2014 | Achanta |
| 2014/0232595 | A1 | 8/2014 | Rife |
| 2014/0250972 | A1 | 9/2014 | Achanta |
| 2014/0327574 | A1 | 11/2014 | Achanta |
| 2014/0334477 | A1 | 11/2014 | Stahlin |
| 2015/0043697 | A1 | 2/2015 | Achanta |
| 2015/0081235 | A1* | 3/2015 | Schweitzer, III .... G01R 31/088 702/59 |
| 2015/0081887 | A1* | 3/2015 | Kalkunte ............ H04L 43/0852 709/224 |
| 2015/0312023 | A1 | 10/2015 | Rice |
| 2015/0331052 | A1 | 11/2015 | Seeley |
| 2015/0364953 | A1 | 12/2015 | Rippon |

OTHER PUBLICATIONS

PCT/US2013/064942 Patent Cooperation Treaty, International Search Report and Written Opinion of the International Searching Authority, dated Jan. 29, 2014.

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

Moore, P., Crossley, P., GPS Applications in Power Systems Part 1 Introduction to GPS, Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

PCT/US2013/064012, Patent Cooperation Treaty, International Search Report and Written Opinion of the International Searching Authority, dated Dec. 19, 2013.

(56) References Cited

OTHER PUBLICATIONS

PCT/US2013/058297, Patent Cooperation Treaty, International Search Report and Written Opinion of the International Searching Authority, dated Feb. 14, 2014.
PCT/US2013/065695, Patent Cooperation Treaty, International Search Report and Written Opinion of the International Searching Authority, dated Mar. 10, 2014.
PCT/US2013/065447, Patent Cooperation Treaty, International Search Report and Written Opinion of the International Searching Authority, dated Mar. 13, 2014.
PCT/US2014/010507 Patent Cooperation Treaty, International Search Report and Written Opinion of the International Searching Authority, dated May 6, 2014.
Shepard, D., Humphreys, T., Fansler, A., "Evaluation of the Vulnerability of Phasor Measurement Units to GPS Spoofing Attacks", Oct. 2, 2011.
PCT/US2014/010422 Patent Cooperation Treaty, International Search Report and Written Opinion of the International Searching Authority, dated Sep. 16, 2014.
PCT/US2014/034358 Patent Cooperation Treaty, International Search Report and Written Opinion of the International Searching Authority, dated Sep. 22, 2014.
PCT/US2014/049813 Patent Cooperation Treaty, International Search Report and Written Opinion of the International Searching Authority, dated Apr. 2, 2015.
PCT/US2015/024000 Patent Cooperation Treaty, International Search Report and Written Opinion of the International Searching Authority, dated Jul. 13, 2015.
PCT/US2015/029939 Patent Cooperation Treaty, International Search Report and Written Opinion of the International Searching Authority, dated Aug. 12, 2015.
PCT/US2015/054144 Patent Cooperation Treaty, International Search Report and Written Opinion of the International Searching Authority, dated Jan. 4, 2016.
Zhou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1, pp. 43-50.

* cited by examiner

TIME SIGNAL MANIPULATION AND SPOOFING DETECTION BASED ON A LATENCY OF A COMMUNICATION SYSTEM

RELATED APPLICATION

The present application claims priority under 35 U.S.C. § 119(e) to U.S. Provisional Patent Application No. 62/272,889 filed Dec. 30, 2015, and titled "TIME SIGNAL SPOOFING DETECTION USING A LATENCY OF A DETERMINISTIC COMMUNICATION SYSTEM," which is incorporated herein by reference in its entirety.

TECHNICAL FIELD

This disclosure relates to detecting manipulation or spoofing of a time based on a latency of a communication system. In various embodiments the techniques disclosed herein may be utilized in electrical power systems and other systems that utilize high-accuracy time sources that may be manipulated or spoofed.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

High-accuracy time sources may be utilized in a variety of applications, such as telecommunications, aerospace, automation, electric power generation and distribution, radar, and scientific applications, etc. A variety of systems, protocols, and/or techniques may be utilized to synchronize devices and/or to permit multiple devices to utilize a common high-accuracy time source. For example, a high-accuracy time signal may be received using an Inter-Range Instrumentation Group (IRIG) protocol, a global navigation satellite system (GNSS), such as, for example, global positioning system (GPS), GLONASS, or the like, a radio broadcast such as a National Institute of Science and Technology (NIST) broadcast (e.g., radio stations WWV, WWVB, and WWVH), the IEEE 1588 protocol, a network time protocol (NTP) codified in RFC 1305, a simple network time protocol (SNTP) in RFC 2030, and/or another time transmission protocol or system.

Protocols and systems for distribution of time information vary in the level of precision that can be achieved and vary in susceptibility to manipulation or spoofing. For example, the precision of NTP and SNTP is limited to the millisecond range, thus making it inappropriate for sub-millisecond time distribution applications. Further, both protocols lack security and are susceptible to malicious network attacks. The IEEE 1588 standard includes hardware-assisted timestamps, which allows for time accuracy in the nanosecond range. Such precision may be sufficient for more demanding applications (e.g., the sampling of the sinusoidal currents and voltages on power lines to calculate "synchrophasors", or use of traveling wave, time-domain, or incremental quantity principles). It is well suited for time distribution at the communication network periphery, or among individual devices within the network. GNSS time signals provide an accurate and robust time measurement, however GNSS signals are susceptible to spoofing. Therefore, it would be beneficial to provide systems and methods for detecting the manipulation or failure of a high-accuracy time signal, such that the best available time signal can be provided to time dependent devices.

Systems and methods consistent with the present disclosure may be utilized in connection with a variety of applications and technologies to detect spoofed or manipulated time signals. A time difference between a local measurement time and a communication from a remote device may be compared against a confidence interval relating to the latency of the communication channel used by the local device and the remote device. When the difference is outside of the confidence interval or exceeds a specified threshold, systems and methods consistent with the present disclosure may determine that the signal has been manipulated or spoofed.

Manipulation of a time signal may occur in a variety of ways. For example, the manipulation may consist of generating a spoofed signal that is provided to time-dependent devices. The spoofed signal may imitate a time signal provided by a high-precision time, but the time signal may be inaccurate or altered. The systems and methods disclosed herein may also detect other forms of manipulation of a signal. For example, the monitoring of the latency of a communication channel may also permit detection of additional networking hardware and/or routing changes. The addition of hardware will increase the transmission time associated with a communication channel. Further, changes to a network route may either increase or decrease the latency of a communication channel. Regardless of whether the latency increases or decreases as a result of an alteration to the network or manipulation of the time signal, the latency may be measured, compared to specific metrics, and utilized to detect the change.

In various embodiments and applications consistent with the present disclosure, deterministic communication systems may be utilized. Deterministic communication systems may help to ensure a relatively low variance in the latency of a communication channel. The low variance of the latency of such systems may allow the thresholds used to detect manipulation of a signal or network to be selected within a relatively narrow range. This relatively low variance of a deterministic communication may enable a greater sensitivity to modifications of the network channel or to manipulation of a time signal.

The principles disclosed herein may also be applied to non-deterministic communication systems. Although the latency may exhibit greater variance in non-deterministic systems, the increased variability may be addressed using a variety of techniques. For example, thresholds may include a larger range in comparison to deterministic systems. Further, such systems may average values over specified windows of time and compare averaged values to specified thresholds to reduce variability in the latency attributable to transient conditions.

Various systems may be used for distribution of precision time information. According to various embodiments disclosed herein, a power system may include components connected using a synchronized optical network (SONET). In such embodiments, precision time information may be distributed using a synchronous transport protocol and synchronous transport modules (STMs). According to one embodiment, a precision time reference can be transmitted within a frame of a SONET transmission. In another embodiment, a precision time reference may be incorporated into a header or an overhead portion of a SONET STM frame. Similarly, the power system may include components connected using Synchronous Digital Hierarchy (SDH) protocol. Although several embodiments herein are described in terms of SONET, it should be recognized that the SDH protocol may be used in place of SONET unless otherwise specified.

Several specific examples disclosed herein relate specifically to electrical power transmission and distribution systems; however, the present disclosure is broadly applicable to any application that utilizes high-accuracy time synchronization. For example, telecommunications applications (e.g., cellular telephone base states), radar, financial, and scientific applications may also utilize high-accuracy time sources.

Electric power transmission and distribution systems may utilize time synchronized measurements to perform a variety of monitoring, protection, and communication tasks. In connection with certain applications, intelligent electronic devices (IEDs) and/or network communication devices may utilize time information accurate beyond the millisecond range. IEDs within a power system may be configured to perform metering, control, and protection functions that require a certain level of time precision and accuracy between one or more IEDs. For example, IEDs may be configured to calculate and communicate time-synchronized phasors (synchrophasors), which may require that the IEDs and network devices be synchronized to within nanoseconds of one another.

IEDs, network devices, and other devices in a power system may include local oscillators or may receive signals from multiple time sources. A common external time source may be used by multiple devices due to the cost of high-accuracy time sources and the needs of applications distributed across large areas. Global Navigation Satellite Systems ("GNSS"), such as the Global Positioning System ("GPS"), the GLObal NAvigation Satellite System ("GLONASS"), or the Galileo Satellite System, are examples of a high-accuracy time source that may be used by multiple devices that are geographically separated. In a variety of applications, a plurality of IEDs may obtain measurements of electrical conditions in one portion of an electric power system, and may associate those measurements with a time stamp derived from a high-accuracy time source. The time-stamped measurements may be time-aligned and used to analyze electrical conditions across the power system. An external time source, such as GNSS, may be more accurate and available across large areas, and therefore may be preferred over local time signals.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and a product of a process.

The phrases "connected to," "networked," and "in communication with" refer to any form of interaction between two or more entities, including mechanical, electrical, magnetic, and electromagnetic interaction. Two components may be connected to each other even though they are not in direct physical contact with each other and even though there may be intermediary devices between the two components.

Some of the infrastructure that can be used with embodiments disclosed herein is already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as non-volatile memory, static RAM, dynamic RAM, ROM, CD-ROM, disk, tape, magnetic, optical, flash memory, or other computer-readable storage medium.

A high-accuracy time reference refers to a time signal or time source relied on by a plurality of devices and distributed by a time distribution device, and which is presumed to be more precise than a local time source. The determination of accuracy may be made based upon a variety of factors. A high-accuracy time reference may allow for specific moments in time to be described and temporally compared to one another.

A time source is any device that is capable of tracking the passage of time. A variety of types of time sources are contemplated, including a voltage-controlled temperature compensated crystal oscillator (VCTCXO), a phase locked loop oscillator, a time locked loop oscillator, a rubidium oscillator, a cesium oscillator, a trained oscillator, a micro-electromechanical device (MEM), and/or other device capable of tracking the passage of time.

A time signal is a representation of the time indicated by a time source. A time signal may be embodied as any form of communication for communicating time information. A wide variety of types of time signals are contemplated, such as those listed above. Time source and time signal may be used interchangeably herein.

Failure of a precision time source and/or precision time signal, as used herein, includes manipulation, spoofing, and/or jamming the signal, mechanical or software failures, system wide outages, etc. Failure of a time source results in a time source that is no longer deemed to be reliable or usable by an end device.

Figure 1:
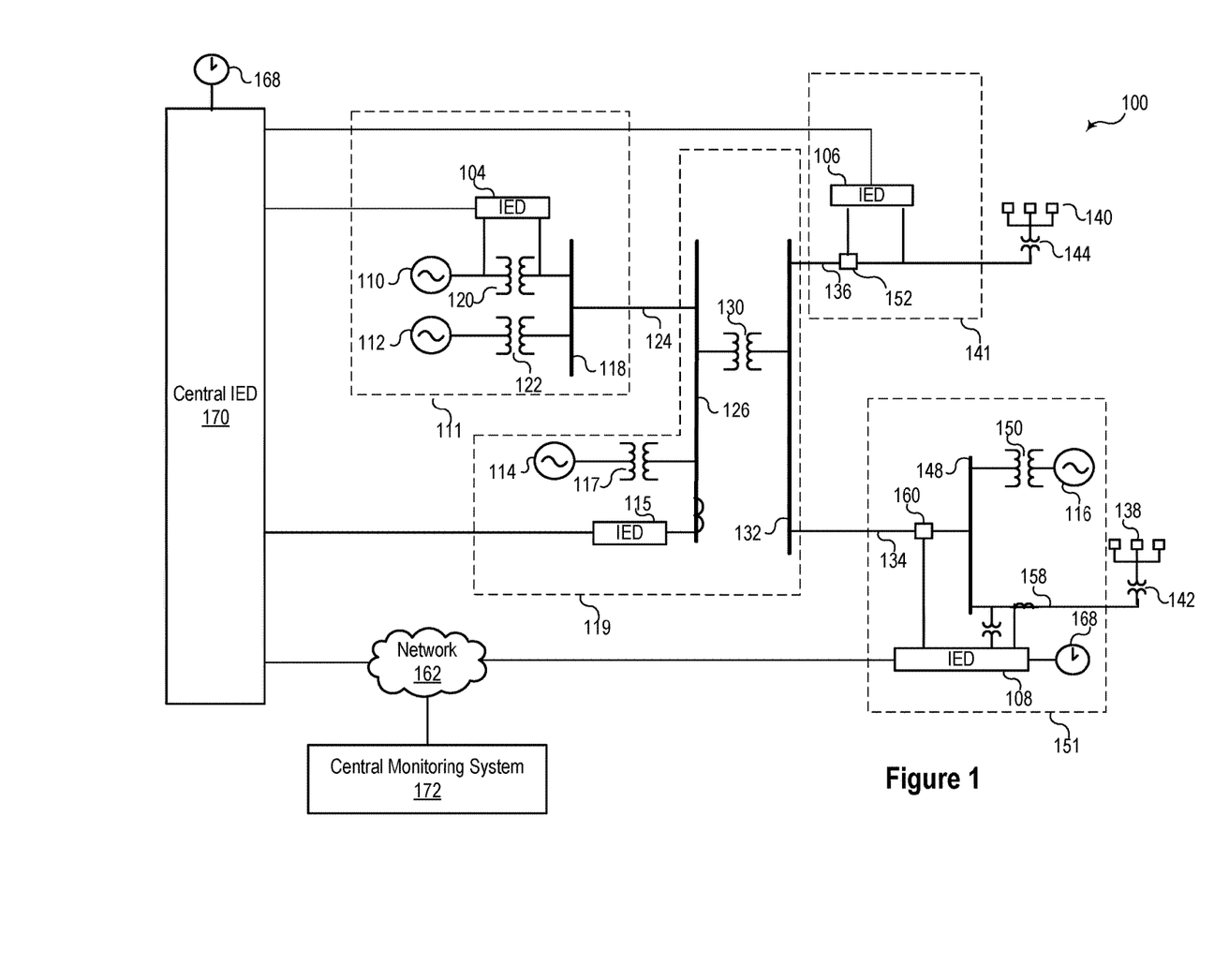
FIG. 1 illustrates an example of an embodiment of a simplified one-line diagram of an electric power delivery system with various substations consistent with embodiments of the present disclosure.

FIG. 1 illustrates an example of an embodiment of a simplified one-line diagram of an electric power delivery system 100 with various substations consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152 and 160), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Electric power delivery system 100 may include a generation substation 111. Substation 111 may include various generators 110 and 112 connected to a bus 118 through step-up transformers 120 and 122. Bus 118 may be connected to bus 126 in substation 119 via transmission line 124. Although the equipment in substation 111 may be monitored and/or controlled by various IEDs, only a single IED 104 is shown. IED 104 may be a transformer protection IED for transformer 120.

A common time signal 168 may be distributed throughout system 100. Utilizing a common or universal time source may ensure that IEDs have a synchronized time signal that can be used to generate time synchronized data, such as synchrophasors. In various embodiments, IEDs 104, 106, 108, 115, 170 may receive a common time signal 168. The time signal may be distributed in system 100 using a communications network 162 or using a common time source, such as a GNSS, or the like. As illustrated, the central IED 170 and IED 108 both receive common time signal 168. Other IEDs may receive the common time signal 168 via a communications network or a dedicated time distribution network as described in more detail herein.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized to perform a variety of tasks that pertain to network communications and/or to operation of equipment within system 100.

As discussed above, an IED may be configured to calculate and communicate synchrophasors with other IEDs. To accurately compare synchrophasors obtained by geographically separate IEDs, each IED may need to be synchronized with a precision time reference with accuracy greater than a millisecond to allow for time-aligned comparisons. According to various embodiments, time synchronization, accurate to the microsecond or nanosecond range, may allow IEDs to perform accurate comparisons of synchrophasors.

The connection of IED 170 and IED 108 via network 162 may represent a communication channel used to communicate a time signal. Information regarding the latency associated with the communication channel may be assessed and utilized in connection with various embodiments consistent with the present disclosure for purposes of detecting manipulation and/or spoofing of time signals. More specifically, information regarding the transmission of messages from IED 108 to IED 170 may permit collection of metrics relating to the communication channel during periods of typical operation. Such information may then be utilized during periods of abnormal operation to detect changes to the network 168 and or manipulation of the time signal 168.

Figure 2:
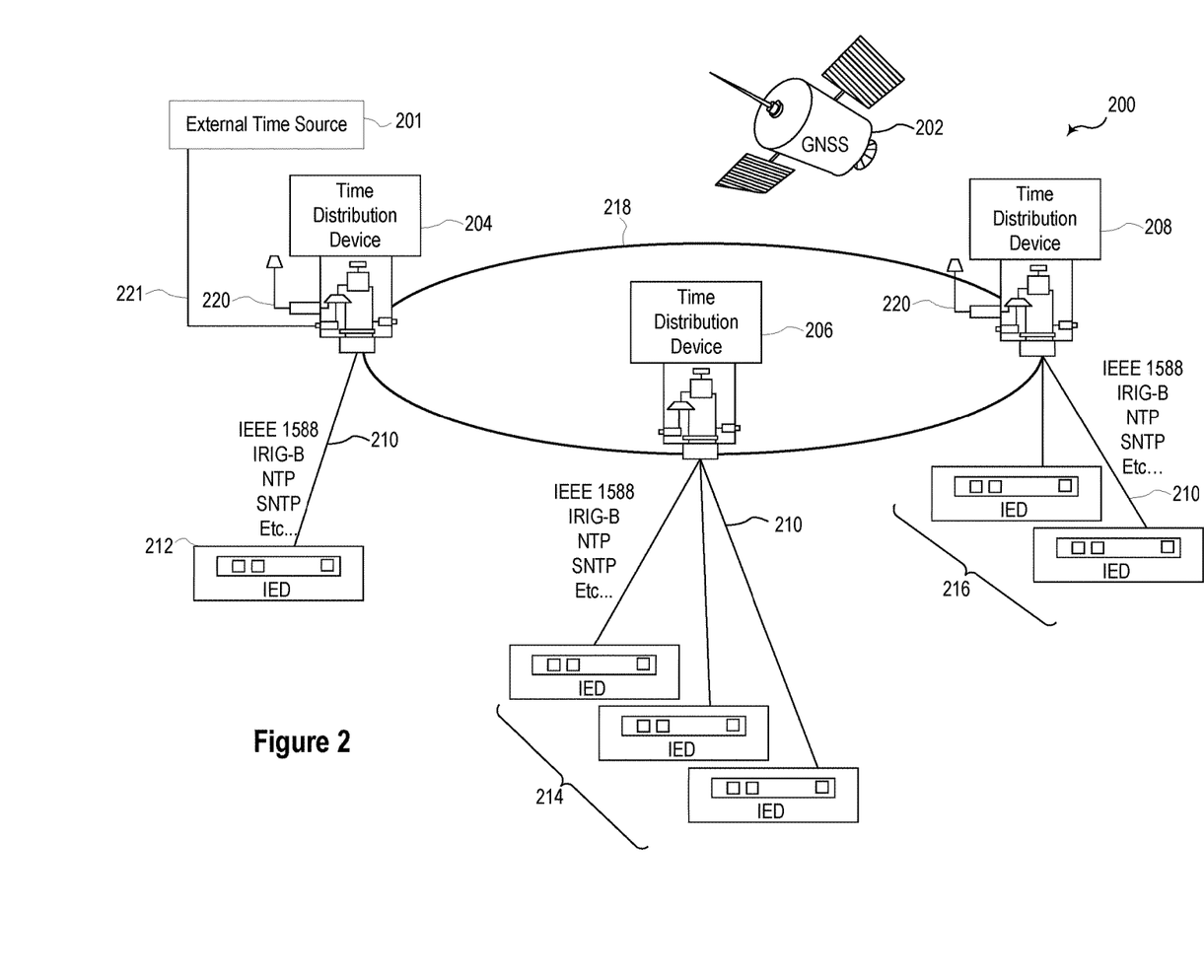
FIG. 2 illustrates a time distribution system including communications IEDs configured to distribute a precision time reference to various IEDs consistent with embodiments of the present disclosure.

FIG. 2 illustrates system 200 configured to be a highly reliable, redundant, and distributed system of distributing a precision time reference to a plurality of time dependent devices. Each time distribution device 204, 206, and 208 may be configured to receive and communicate time signals through multiple protocols and methods. While the system 200 is described as being capable of performing numerous functions and methods, it should be understood that various systems are possible that may have additional or fewer capabilities. Specifically, a system 200 may function as desired using only one protocol, or having fewer external or local time signal inputs.

As illustrated in FIG. 2, three time distribution devices 204, 206, and 208 have WAN capabilities and are communicatively connected to a WAN 218, which may comprise one or more physical connections and protocols. Each time distribution device 204, 206, and 208 may also be connected to one or more IEDs within a local network. For example, time distribution device 204 is connected to IED 212, time distribution device 206 is connected to IEDs 214, and time distribution device 208 is connected to IEDs 216. A time distribution device may be located at, for example, a power generation facility, a hub, a substation, a load center, or other location where one or more IEDs are found. In various embodiments, an IED may include a WAN port, and such an IED may be directly connected to WAN 218. IEDs may be connected via WAN 218 or LANs 210. Time distribution devices 204, 206, and 208 may establish and maintain a precision time reference among various system components. Each time distribution device 204, 206, and 208 may be configured to communicate time information with IEDs connected on its LAN through one or more time distribution protocols, such as IEEE 1588, IRIG-B, NTP, SNTP, and the like.

Each time distribution device 204, 206, and 208 may be configured to receive time signals from a variety of time sources. For example, as illustrated, time distribution device 204 includes an antenna 220 and is configured to receive a GNSS signal from a GNSS repeater or satellite 202. Time distribution device 204 is also configured to receive a second time signal 221 from an external time source 201. The external time source may comprise one or more VCTCXOs, phase locked loop oscillators, time locked loop oscillators, rubidium oscillators, cesium oscillators, NIST broadcasts (e.g., WWV and WWVB), and/or other devices capable of generating precise time signals. In the illustrated embodiment, time distribution device 208 also includes an antenna 220 configured to receive a GNSS signal from the GNSS repeater or satellite 202. As illustrated, time distribution device 206 does not directly receive an external time signal, however, according to alternative embodiments, any number and variety of external time signals may be available to any of the time distribution devices.

According to one embodiment, WAN 218 comprises a SONET configured to embed a precision time reference in a header or overhead portion of a SONET frame during transmission. Alternatively, a precision time reference may be conveyed using any number of time communications methods including IRIG protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure. Protocols used for inter IED time synchronization may be proprietary, or based on a standard, such as IEEE 1588 Precision Time Protocol (PTP).

According to various embodiments, time distribution devices 204, 206, and 208 are configured to perform at least one of the methods of detecting failure, manipulation, or spoofing of a time source. System 200 may utilize a single method or combination of methods, as described herein.

It is of note that even the most precise time signals may exhibit small discrepancies. For example, depending on the length and routing of the GNSS antenna cable, various clocks may exhibit microsecond level time offsets. Some of these offsets may be compensated by the user entering compensation settings, or may need to be estimated by the time synchronization network. Estimation may be performed during long periods of "quiet" operation (i.e., periods with no disruptions or faults), with the individual source results stored locally in a nonvolatile storage register.

Figure 3:
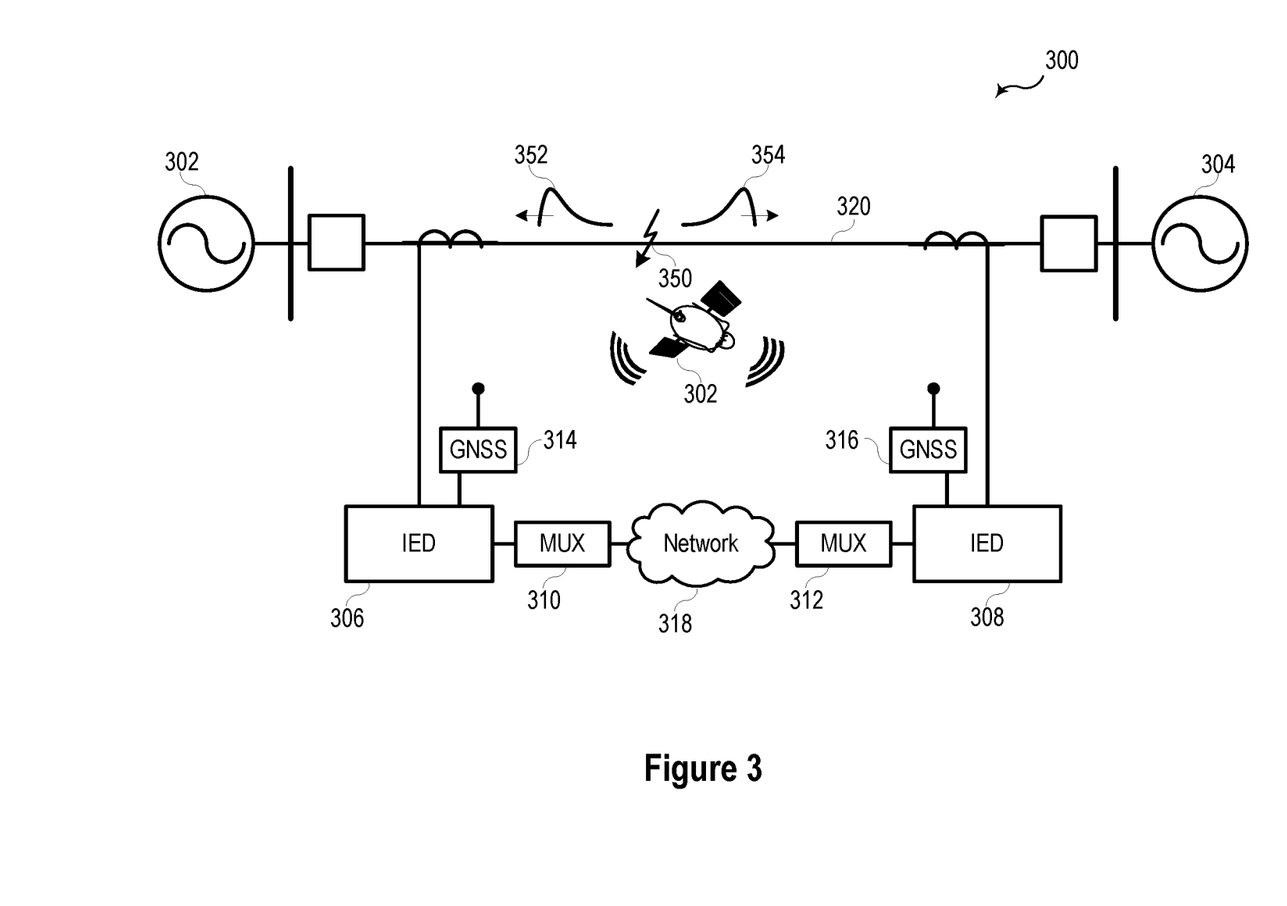
FIG. 3 illustrates a one-line diagram of a system for detection of time signal spoofing on an electric power delivery system using a deterministic communication system latency consistent with embodiments of the present disclosure.

FIG. 3 illustrates a one-line diagram of a system 300 for detection of time signal spoofing on an electric power delivery system using a deterministic communication system latency consistent with embodiments of the present disclosure. System 300 includes two sources 302, 304 that are connected by an electric power line 320. System 300 is protected by a first IED 306 at a local location on the electric power system, and a second IED 308 at a remote location on the electric power system. The IEDs may be configured to use traveling wave, time domain, and/or incremental quantity principles to protect and monitor the electric power system 300. To that end, IEDs 306, 308 may each be in communication with (or include) a GNSS receiver 314, 316 to receive a common time signal from a GNSS system 302. IEDs 306, 308 may be in communication using a deterministic communication network 318 using devices, such as mulitplexors 310, 312, as described in more detail hereinabove.

IEDs 306, 308 may be time synchronized using the common time signal from GNSS 302, such that measurements of the electric power system are associated with a high-accuracy time stamp. The high-accuracy time stamps may allow for comparison of measurements taken at the same time at different locations. Such a system may utilize high sampling rates MHz), high-resolution (≥16 bits) synchronized sampling, high-fidelity time synchronization, and a communications network capable of exchanging all acquired data (≥100 Mbps), or high numeric burden required by some of the algorithms (≥1 G multiplications per second). IEDs 306, 308 may depend on the receipt and transmission of communications for executing electric power system protection algorithms.

According to various embodiments consistent with the present disclosure, IEDs 306, 308 may detect manipulation of the network 318 or spoofing of the GNSS signals by tracking the latency of the deterministic communication system, and comparing a present latency measurement against previous latency measurements. Spoofing of GNSS signals to either of the GPS receivers 314, 316 and/or manipulation of information transmitted through network 318 may result in an erroneous detection of fault location, fault direction, and/or other aspects of the fault.

IEDs 306, 308 may be configured to both relays to perform and exchange measurements. A time $t_0$, IEDS 306, 308 may each perform a measurement and communicate the measurement through network 318. Various techniques may be utilized to synchronize the measurements taken by IEDS 306, 308. For example, measurements may be performed according to a schedule (e.g., at the top of every second) or may be performed based on a specified condition. The measured values taken simultaneously by IEDs 306, 308 may be transmitted through network 318 for use in connection with protection of system 300. If the time at which the measurements are taken is designated as $t_0$, and the time that the measurements are received across the network 318 is designated as $t_1$, the time to traverse the network 318, $t_{Channel}$, may be determined using Eq. 1.

$$t_1 - t_0 = t_{Channel} \qquad \text{Eq. 1}$$

The time to traverse the network 318, or the network latency, may be repeatedly measured. These repeated measurements may enable IEDs 306, 308 to deviations in the network latency. In some embodiments, a statistical dataset may be generated using the plurality of measurements. The statistical dataset may be analyzed to establish specific thresholds that may be used to identify anomalous conditions that may be associated with alternation of a time signal received from GNSS 302 and/or manipulation of the network 318. For example, a maximum threshold may be specified for the channel latency based on a statistical dataset. When the latency exceeds the maximum threshold, an alert may be triggered to indicate potential spoofing or manipulation of network 318.

The measured latency of network 318 may be increased or decreased by a spoofed time source or by alternations of network 318. The measured latency of network 318 may be increased by the incorporation of additional networking hardware, additional complexity in network routing, etc. Further, a slower-than-normal spoofed time signal may also result in an increase in channel latency. The measured latency of network 318 may be decreased by changing a flow of data through the network 318 or by spooking a faster-than-normal time signal.

The information utilized to determine the measured latency of the network 318 may also be utilized to monitor and protect system 300 from events, such as electrical faults. In the specifically illustrated embodiment, a fault 350 occurs on transmission line 320. The fault 350 generates traveling waves 352, 354, which are launched toward sources 302, 304. The traveling waves may travel at a speed approaching the speed of light. By comparing the times of arrival of the traveling waves at each location, IEDs 306, 308 may determine the direction to the fault, location of the fault, and other information about the fault in order to make protection decisions. The same measurements that may be analyzed to monitor the latency of network 318 may also provide information about fault 350. Such information may be analyzed by IEDs 306, 308 to determine the direction to the fault, location of the fault, and other information about the fault in order to implement protective actions. Although FIG. 3 illustrates one specific example configured to detect fault 350 based on traveling waves 352, 354, a variety of other types of systems are also contemplated.

Figure 4:
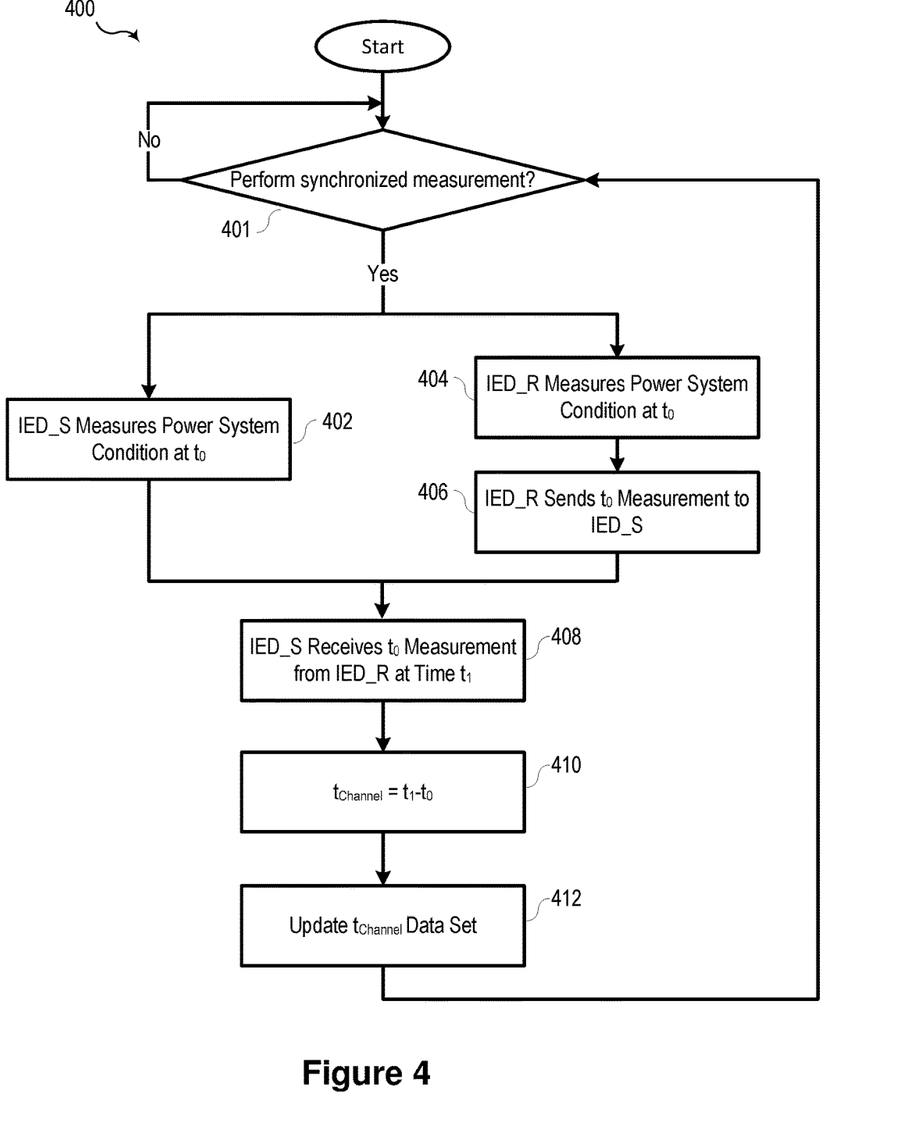
FIG. 4 illustrates a flow chart of one embodiment of a method for tracking a latency of a communication system consistent with embodiments of the present disclosure.

FIG. 4 illustrates a flow chart of one embodiment of a method 400 for tracking a latency of a communication system consistent with embodiments of the present disclosure. In various embodiments, method 400 may be performed in a system similar to system 300, as illustrated in FIG. 3, in which one of IEDs 306, 308 may be deemed the local IED and the other is deemed the remote IED.

At 401, method 400 determines whether to perform a synchronized measurement. In various embodiments, synchronized measurements may be performed according to a specific schedule and based on a common time signal. For example, in one embodiment, a measurement may be performed by a variety of devices at the top of each second based on a GNSS signal received by the devices.

At 402, each of a local (IED_S) and remote (IED_R) IEDs creates a measurement of at least one power system conditions at time $t_0$ 402, 404. The remote IED then sends the $t_0$ measurements to the local IED_S 406 through a communication network. The local IED_S receives the $t_1$ measurement from the remote IED_R at time $t_1$ through the communication network at 408.

At 410, the local IED_S may determine the communication system latency $t_{Channel}$ as the difference between $t_1$ and $t_0$. The local IED_S may then update the communication system latency $t_{Channel}$ data set at 412. In some embodiments, the data set may include a specified number of values of $t_{Channel}$ or values over a specified period of time. Various physical parameters associated with an operating environment may influence the velocity factor of physical media in a system. For example, temperature may influence the velocity factor, but temperature changes typically occur over relatively long periods of time (i.e., from day to night, from one season to another) relative to the latency of the communication system latency. In various embodiments, the data set 412 may include statistical information regarding the data set, such as averages, standard deviation, and other parameters reflecting the distribution of measurements of $t_{Channel}$. In one specific embodiment, the statistical data set may represent a Gaussian or normal distribution.

Figure 5:
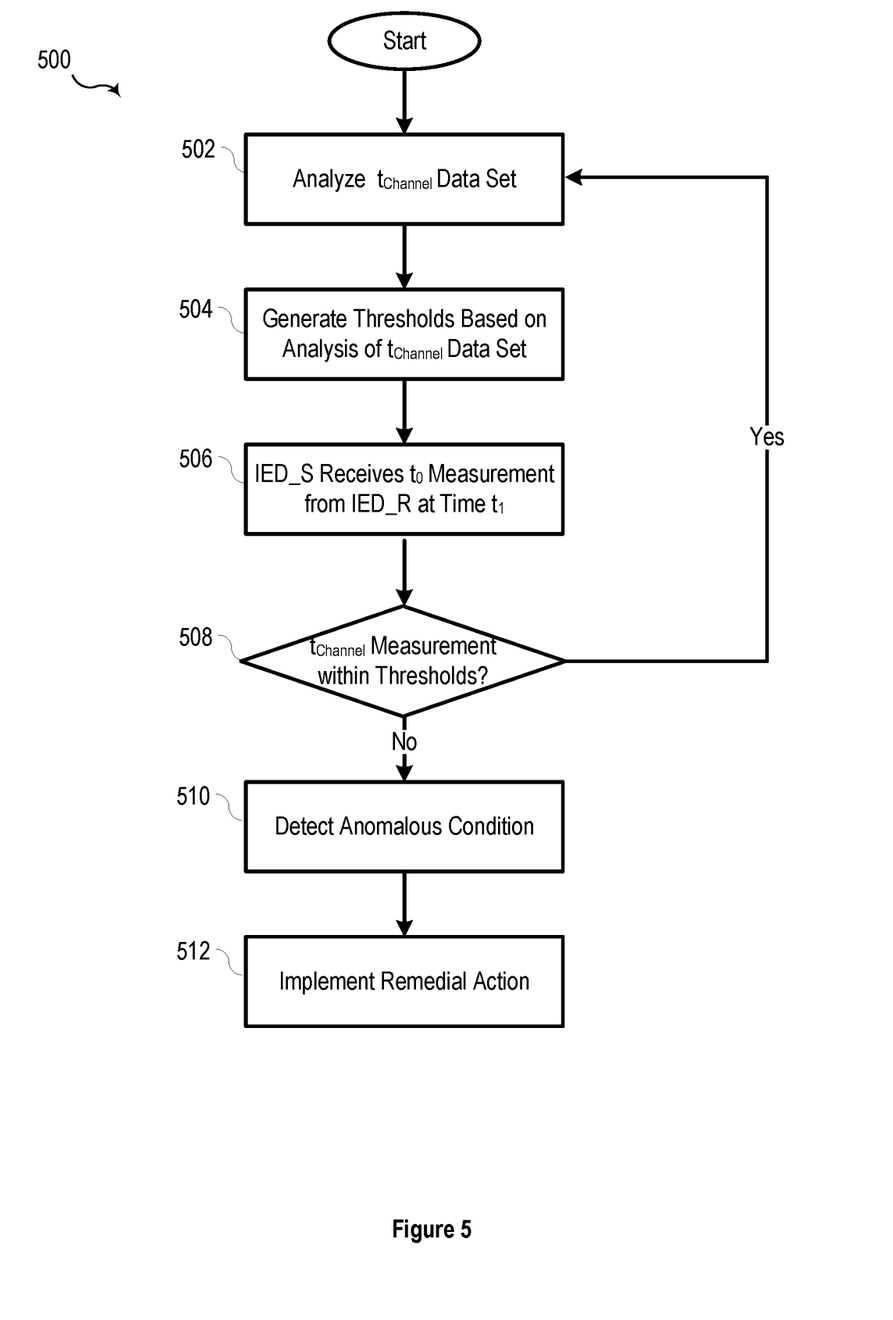
FIG. 5 illustrates a flow chart of one embodiment of a method for detection of an anomalous condition based on a latency measurement in a communication system consistent with embodiments of the present disclosure.

FIG. 5 illustrates a flow chart of one embodiment of a method 500 for detection of an anomalous condition based on a latency measurement in a communication system consistent with embodiments of the present disclosure. At 502, method 500 may analyze a data set of latency information. In various embodiments, the data set may be generated using method 400, as illustrated in FIG. 4.

At 504, a plurality of thresholds may be generated based on the analysis of the data set performed at 502. The thresholds may be selected based on the parameters of the data, the characteristics of the system, the specific application to which method 500 is applied, or to a combination of the foregoing. In some embodiments, the variability in the latency measurements may be low, and accordingly, the thresholds may define a relatively narrow latency range. In other embodiments, the latency measurement may exhibit greater variability, and the thresholds may be selected to accommodate such variability At 506, IED_S receives at time $t_1$ a measurement taken at time $t_0$ from a remote IED. The value of $t_{Channel}$ may be determined and may be compared to the thresholds at 508. If the value of $t_{Channel}$ is within the thresholds, method 500 may return to 502. In some embodiments, the thresholds may include a confidence interval comprising multiples of the channel latency. In one embodiment, the threshold is expressed in Eq. 2.

$$k_1 * t_{Channel\_Avg} < t_1 - t_0 < k_2 * t_{Channel\_Avg} \qquad \text{Eq.2}$$

In some embodiments, the factors $k_1$ and $k_2$ may be predetermined. In other embodiments, the factors $k_1$ and $k_2$ may be determined based on variation in communication channel latency. For example, the factors may be higher for a communication channel with higher latency or more variation in latency. Factors $k_1$ and $k_2$ may be equidistant from unity.

An abnormal condition at 510 may represent a variety of conditions. For example, the abnormal condition may represent a spoofed time signal or a modification of network. In response to the abnormal condition, a remedial action may be implemented at 512. In various embodiment, the remedial action may comprise suppressing control actions based on measurements that are not within the thresholds. Still further, measurements that are not within the threshold may be excluded from the data set analyzed at 502.

Although FIGS. 4 and 5 illustrates the local IED_S receiving measurements from the remote IED_R and tracking the communication system latency, it should be noted that both IEDs may send measurements to the other IED, and track communication system latency independently. Furthermore, IEDs may periodically compare communication system latency. IEDs may transmit a latency determination to the other IED. Upon detection of an anomalous condition, the IEDs (IED_S and IED_R) may modify their protection algorithms such that communication or time signals are not used to determine a fault condition.

Figure 6:
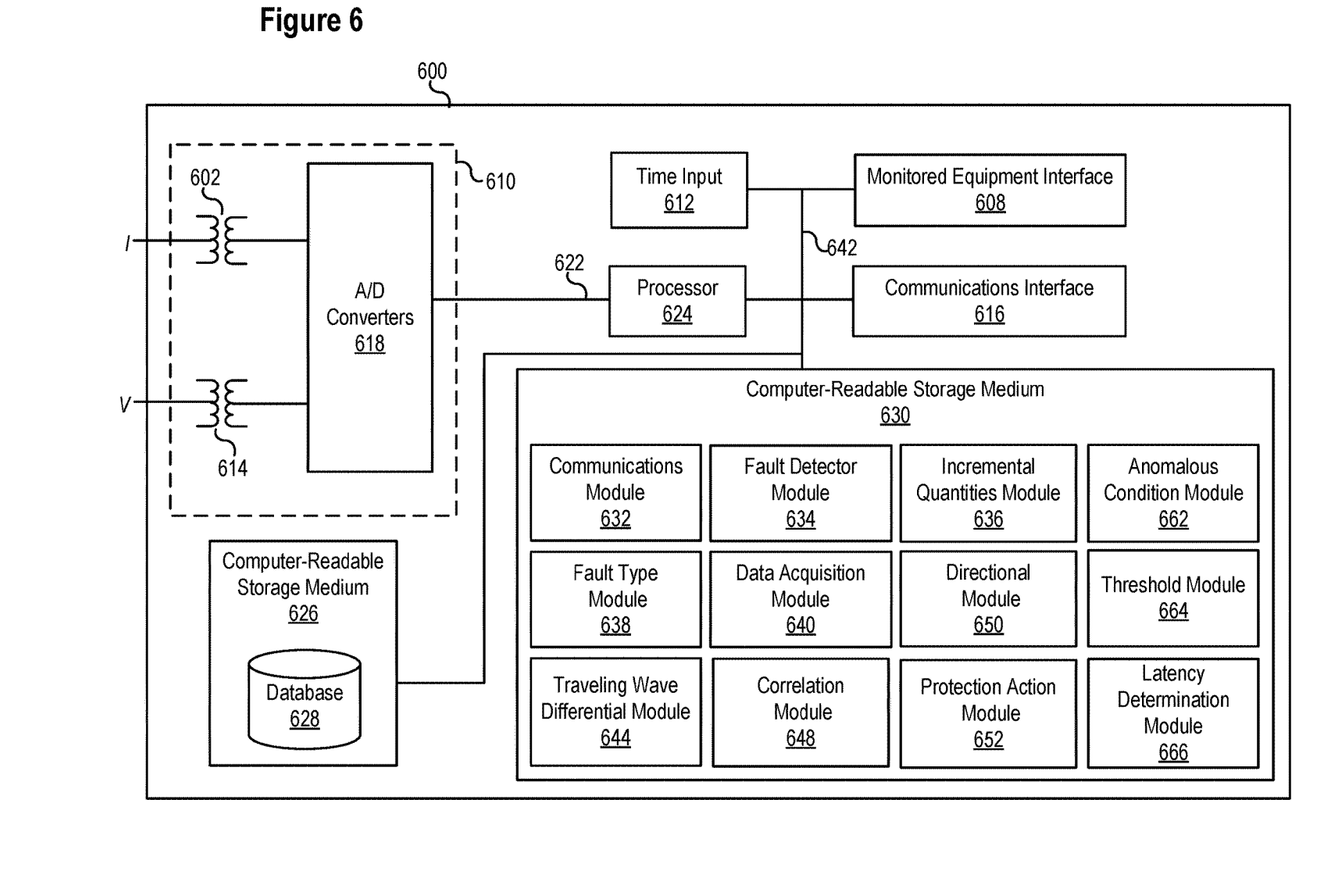
FIG. 6 illustrates a functional block diagram of a system configured to detect an anomalous condition based on a latency measurement in a communication system consistent with embodiments of the present disclosure.

FIG. 6 illustrates a functional block diagram of a system 600 configured to detect an anomalous condition based on a latency measurement in a communication system consistent with embodiments of the present disclosure. In certain embodiments, the system 600 may comprise an IED system configured to, among other things detect and locate faults using a time-domain distance module, detect and locate faults using a time-domain directional module, and detect and locate faults using traveling waves. System 600 may be implemented using hardware, software, firmware, and/or any combination thereof. In some embodiments, system 600 may be embodied as an IED, while in other embodiments, certain components or functions described herein may be associated with other devices or performed by other devices. The specifically illustrated configuration is merely representative of one embodiment consistent with the present disclosure.

System 600 includes a communications interface 616 configured to communicate with devices and/or IEDs. In certain embodiments, the communications interface 616 may facilitate direct communication with other IEDs or communicate with systems over a communications network. Communications interface 616 may facilitate communications through a network.

System 600 may further include a time input 612, which may be used to receive a time signal (e.g., a common time reference) allowing system 600 to apply a time-stamp to the acquired samples. In certain embodiments, a common time reference may be received via communications interface 616, and accordingly, a separate time input may not be required for time-stamping and/or synchronization operations. One such embodiment may employ the IEEE 1588 protocol. A monitored equipment interface 608 may be configured to receive status information from, and issue control instructions to, a piece of monitored equipment (such as a circuit breaker, conductor, transformer, or the like).

Processor 624 may be configured to process communications received via communications interface 616, time input 612, and/or monitored equipment interface 608. Processor 624 may operate using any number of processing rates and architectures. Processor 624 may be configured to perform various algorithms and calculations described herein. Processor 624 may be embodied as a general purpose integrated circuit, an application specific integrated circuit, a field-programmable gate array, and/or any other suitable programmable logic device.

In certain embodiments, system 600 may include a sensor component 610. In the illustrated embodiment, sensor component 610 is configured to gather data directly from conventional electric power system equipment such as a conductor (not shown) using conventional PTs and/or CTs. The sensor component 610 may use, for example, transformers 602 and 614 and A/D converters 618 that may sample and/or digitize filtered waveforms to form corresponding digitized current and voltage signals provided to data bus 622. Current (I) and voltage (V) inputs may be secondary inputs from conventional instrument transformers such as, CTs and VTs. A/D converters 618 may include a single A/D converter or separate A/D converters for each incoming signal. A current signal may include separate current signals from each phase of a three-phase electric power system. A/D converters 618 may be connected to processor 624 by way of data bus 622, through which digitized representations of current and voltage signals may be transmitted to processor 624. In various embodiments, the digitized current and voltage signals may be used to calculate time-domain quantities for the detection and the location of a fault on an electric power system as described herein.

A computer-readable storage medium 626 may be the repository of a database 628 containing information relating to latency in a network through which system 600 may communicate. The database may comprise a plurality of latency measurements and/or statistical measurements associated with a plurality of latency measurements. Another computer-readable storage medium 630 may be the repository of various software modules configured to perform any of the methods described herein. A data bus 642 may link monitored equipment interface 608, time input 612, communications interface 616, and computer-readable storage mediums 626 and 630 to processor 624.

Computer-readable storage mediums 626 and 630 may be separate mediums, as illustrated in FIG. 6, or may be the same medium (i.e. the same disk, the same non-volatile memory device, or the like). Further, the database 628 may be stored in a computer-readable storage medium that is not part of the system 600, but that is accessible to system 600 using, for example, communications interface 616.

Communications module 632 may be configured to allow system 600 to communicate with any of a variety of external devices via communications interface 616. Communications module 632 may be configured for communication using a variety of data communication protocols (e.g., UDP over Ethernet, IEC 61850, etc.). Communication module 632 may be configured to determine the latency information regarding information received through communications interface 616.

Data acquisition module 640 may collect data samples such as the current and voltage quantities and the incremental quantities. The data samples may be associated with a timestamp and made available for retrieval and/or transmission to a remote IED via communications interface 616. Traveling waves may be measured and recorded in real-time, since they are transient signals that dissipate rapidly in an electric power delivery system. Data acquisition module 640 may operate in conjunction with fault detector module 634. Data acquisition module 640 may control recording of data used by the fault detector module 634. According to one embodiment, data acquisition module 640 may selectively store and retrieve data and may make the data available for further processing. Such processing may include processing by fault detector module 634, which may be configured to determine the occurrence of a fault with an electric power distribution system.

An incremental quantities module 636 may be configured to calculate time domain incremental quantities based on the techniques disclosed herein. The incremental quantities module 636 may be configured to use digitized representations of current and/or voltage measurements to calculate incremental quantities therefrom. In some embodiments, system 600 may be one of a pair of IEDs in communication with different terminals on an electric power system such as the IEDs and system of FIG. 1. In one embodiment, each IED of a pair of IEDs calculates incremental quantities in its own incremental quantities module 636 for later processing and sharing between the IEDs. In another embodiment, system 600 may receive digitized representations from both the sensor component 610 and from a remote IED over a communications channel, and the incremental quantities module 636 may be configured to calculate incremental signals from both sources to calculate both local and remote incremental quantities.

A fault type module 638 may be configured to determine a fault type using incremental quantities from module 636. Traveling wave differential module 644 may determine a control operation in response to a fault by determining a direction to a fault using traveling wave differential calculations. A correlation module 648 may be configured to receive local and remote incremental quantities, and to correlate them. The correlation may be done by time alignment using time stamps.

A directional module 650 may be configured to determine a direction (forward or reverse) to a fault. The directional module 650 may be configured to use incremental quantities from incremental quantities module 636 to determine a direction to a fault. In certain embodiments, directional module 650 may be configured to determine the direction based on the polarity of traveling waves. In such embodiments, the polarities of the voltage and current traveling waves are opposite if the fault is in the forward direction. If the fault is in the reverse direction, the voltage and current traveling waves have same polarity.

A protective action module 652 may be configured to implement a protective action based on the declaration of a fault by the fault detector module 634. In various embodiments, a protective action may include tripping a breaker, selectively isolating a portion of the electric power system, etc. In various embodiments, the protective action module 652 may coordinate protective actions with other devices in communication with system 600.

In various embodiments system 600 may be configured to provide protection based on instantaneous voltages and currents. Such signal components require shorter data windows but facilitate faster protection. Various embodiments of system 600 may be configured to achieve an operating time of approximately 1 millisecond. Such a system may utilize a lumped parameter circuit-based and TW-based time-domain approach and may allow for versatile applications covering various relay input voltage sources and available communications channels. Such a system may utilize high sampling rates ($\geq 1$ MHz), high-resolution ($\geq 16$ bits) synchronized sampling, high-fidelity time synchronization, and a communications network capable of exchanging all acquired data ($\geq 100$ Mbps), or high numeric burden required by some of the algorithms ($\geq 1$ G multiplications per second).

A latency determination module 666 may be configured to determine a latency of a communication channel. In one specific embodiment, the latency determination module 666 may be configured to implement method 400, as illustrated in FIG. 4. Latency determination module 666 may further be configured to generate a dataset representing the latency of the communication channel and/statistical representations of latency information. In some embodiments, a dataset relating to latency of the communication channel may be stored in database 628. In various embodiments, the dataset of latency information may be utilized to establish thresholds to detect anomalous conditions associated with a communications network associated with communications interface 616 and/or a time signal associated with time input 612.

A threshold module 664 may be configured to determine whether latency measurements associated with communications received via communications interface 616 falls within established thresholds. In some embodiments, the thresholds may be pre-established, while in other embodiments, threshold module 664 may be configured to establish and/or modify the thresholds. For example, the thresholds may be determines based on an analysis of the dataset generated by latency determination module 666. In one specific embodiment, the thresholds may represent factors $k_1$ and $k_2$ and a statistical representation (e.g., an average) of the communication channel latency. In some embodiments, the thresholds may be defined in terms of a standard deviation based on the latency dataset.

System 600 may further include an anomalous condition module 662. The anomalous condition module 662 may detect spoofing of a time signal or manipulation of a network by determining the communication channel latency and comparing a present latency value against one or more thresholds. In various embodiments, anomalous condition module 662 may be configured to implement the methods illustrated in FIG. 5 and the description thereof.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. An intelligent electronic device (IED), comprising:
a time input configured to receive a time signal;
a monitored equipment interface in electrical communication with an electric power system at a first location, wherein the monitored equipment interface is configured to obtain a first measurement of electrical conditions at the first location at a first time based on the time signal;
a communications interface configured to receive via a communication system a second measurement of electrical conditions obtained at a second location by another IED and at the first time based on the time signal;
a latency determination subsystem in communication with the time input, monitored equipment interface, and communications interface and configured to determine a latency based on a comparison between a second time in which the second measurement is received by the IED via the communication system and the first time;
a threshold subsystem configured to generate an indication of whether the latency exceeds a first threshold;
an anomalous condition subsystem configured to identify an anomalous condition based on the indication; and
a remedial action subsystem configured to exclude the second measurement from a control action of the electric power system when the latency exceeds the first threshold.

2. The IED of claim 1, wherein the anomalous condition comprises spoofing of the time signal at one of the first location and the second location.

3. The IED of claim 1, wherein the anomalous condition comprises a configuration change in the communication system.

4. The IED of claim 1, wherein the time system input is configured to receive the time signal from a Global Navigation Satellite System.

5. The IED of claim 1, wherein the latency determination subsystem is configured to generate a dataset based on the latency at a plurality of times.

6. The IED of claim 5, wherein the threshold subsystem is further configured to generate the first threshold based on the dataset.

7. The IED of claim 1, wherein the remedial action comprises suppressing the control action configured to reconfigure the electric power system.

8. The IED of claim 1, wherein the communication system comprises a deterministic communication system.

9. The IED of claim 1, wherein the threshold subsystem is further configured to generate the indication based on whether the communication system latency is less than the first threshold and greater than a second threshold.

10. The IED of claim 9, wherein the first threshold comprises a first product of a first multiplier and a statistical representation of the latency of the communication system, and the second threshold comprises a second product of a second multiplier and the statistical representation of the latency of the communication system.

11. The IED of claim 1, further comprising a fault detection module configured to detect a fault in the electric power system based on the first measurement of electrical conditions at the first location and the second measurement of electrical conditions at the second location, and wherein the fault detection module is further configured to generate a control instruction to clear the fault.

12. The IED of claim 11, wherein the first measurement of electrical conditions and the second measurement of electrical conditions represent a traveling wave generated by the fault.

13. A method, comprising:
receiving a time signal at each of a first location and a second location;
generating, via a first intelligent electronic device (IED) at the first location, a first measurement of electrical conditions at the first location at a first time based on the time signal;
generating, via a second IED at the second location, a second measurement of electrical conditions at the second location at the first time based on the time signal;
transmitting the second measurement from the second IED through a communication system to the first IED;
determining a latency based on a comparison between a second time in which the second measurement is received by the first IED and the first time;
generating an indication of whether the latency exceeds a first threshold;
identifying an anomalous condition based on the indication; and excluding the second measurement from a control action of an electric power system when the latency exceeds the first threshold.

14. The method of claim 13, wherein the anomalous condition comprises spoofing of the time signal at one of the first location and the second location.

15. The method of claim 13, further comprising generating a dataset based on the latency at a plurality of times.

16. The method of claim 15, further comprising generating the first threshold based on the dataset.

17. The method of claim 13, wherein the remedial action comprises suppressing the control action configured to reconfigure the electric power system.

18. The method of claim 13, further comprising:
detecting a fault in the electric power system based on the first measurement of electrical conditions at the first location and the second measurement of electrical conditions at the second location; and
generating a control instruction to clear the fault.

19. A system, comprising:
a time input configured to receive a time signal;
a monitored equipment interface configured to receive, via measuring conditions of a power delivery system, a first representation of a first condition at a first location at a first time based on the time signal;
a communications interface configured to receive, via a communication system, a second representation of a second condition at a second location and at the first time based on the time signal;
a latency determination subsystem in communication with the time input, monitored equipment interface, and the communications interface and configured to determine a latency based on a comparison between a second time in which the second measurement is received by the second interface through the communication system and the first time;
a threshold subsystem configured to generate an indication of whether the latency exceeds a threshold;
an anomalous condition subsystem configured to identify an anomalous condition based on the indication; and
a remedial action subsystem configured to exclude the second measurement from a control action of an electric power system when the latency exceeds the first threshold.

* * * * *